(12) United States Patent
Delnoij

(10) Patent No.: US 8,575,846 B2
(45) Date of Patent: Nov. 5, 2013

(54) ILLUMINATION SYSTEM WITH AUTOMATIC ADAPTATION TO DAYLIGHT LEVEL

(75) Inventor: Roger Peter Anna Delnoij, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 253 days.

(21) Appl. No.: 13/054,657

(22) PCT Filed: Jul. 16, 2009

(86) PCT No.: PCT/IB2009/053088
§ 371 (c)(1),
(2), (4) Date: Jan. 18, 2011

(87) PCT Pub. No.: WO2010/010491
PCT Pub. Date: Jan. 28, 2010

(65) Prior Publication Data
US 2011/0115386 A1    May 19, 2011

(30) Foreign Application Priority Data
Jul. 23, 2008   (EP) ..................................... 08160958

(51) Int. Cl.
*H05B 37/02* (2006.01)
(52) U.S. Cl.
USPC ............ 315/152; 315/158; 315/291; 315/308
(58) Field of Classification Search
USPC ............ 315/152–158, 209 R, 291, 294, 307, 315/308, 360–363; 340/825.06, 825.72
See application file for complete search history.

(56) References Cited

U.S. PATENT DOCUMENTS

| | | | |
|---|---|---|---|
| 5,455,487 A | 10/1995 | Mix et al. | |
| 6,160,352 A | 12/2000 | Steinel | |
| 6,340,864 B1 | 1/2002 | Wacyk | |
| 7,274,907 B1 | 9/2007 | Perotti et al. | |
| 7,301,477 B2 | 11/2007 | Isoyama et al. | |
| 7,619,539 B2 * | 11/2009 | Veskovic et al. | 340/4.3 |
| 2004/0206609 A1 | 10/2004 | Tilley | |
| 2005/0179404 A1* | 8/2005 | Veskovic et al. | 315/291 |
| 2005/0264415 A1 | 12/2005 | Katz | |
| 2007/0103007 A1* | 5/2007 | Miki | 307/149 |
| 2007/0216314 A1 | 9/2007 | Langgabner | |
| 2008/0007394 A1 | 1/2008 | Roberts | |

\* cited by examiner

*Primary Examiner* — Jimmy Vu
(74) *Attorney, Agent, or Firm* — Yuliya Mathis

(57) ABSTRACT

An illumination system (10) comprises: —a light source (11); —a controller (12) controlling the power output of the light source; —a light sensor (16) wirelessly communicating with the controller. In a normal mode, the controller controls the light source such that the light level remains substantially constant. In a change mode, the controller controls the light source such that the light level is gradually changed with a predetermined change rate (R) such as to decrease a deviation from a target level ($L_T$). The controller switches from its normal mode to its change mode on the basis of input signals received from the light sensor. The light sensor measures a light level, and decides whether or not to communicate a signal to the controller. The light sensor refrains from transmitting a signal when receiving the signal will not cause the controller to change its control behavior.

12 Claims, 6 Drawing Sheets

ILLUMINATION SYSTEM WITH AUTOMATIC ADAPTATION TO DAYLIGHT LEVEL

FIELD OF THE INVENTION

The present invention relates in general to the field of lighting systems used for illumination of the environment of people, particularly working rooms or living rooms in buildings. Although more widely applicable, the present invention will be explained for the case of working stations in an office building.

BACKGROUND OF THE INVENTION

At a working station, it is generally desirable to have a certain level of light (i.e. light intensity), and in many countries there are even health regulations specifying a minimum level of light for the workers. This level may depend on the type of work being performed. To provide such light level under all circumstances, it is necessary to arrange light sources (lamps) capable of providing said light level. However, during daytime, sunlight may enter the room in question, and may contribute to the light level at the working station. If the lamps would be operating at their nominal light output, the light level would be higher than necessary. Thus, energy can be saved if the light output of the lamps is reduced with increasing daylight level, such that the total light level remains substantially constant.

For this purpose, systems have been developed comprising dimmable lamps, and a lamp controller for controlling the dim level of the lamps on the basis of the daylight level. The daylight level is measured by one or more daylight sensors, which provide(s) a measuring signal to the controller.

In new systems to be installed, such daylight sensor(s) may be coupled to the controller by wires, but greater flexibility y is obtained if wireless sensors are used. Further, in existing buildings with existing illumination systems, it is easier to use wireless sensors as compared to the necessity of arranging wirings. A wireless sensor provides its measuring signal to the controller by a suitable wireless communication transmission, such as for instance ZIGBEE.

A wireless sensor will be powered from a dedicated power source such as a battery, possibly recharged by a photovoltaic converter using captured daylight if the higher system costs are acceptable. With such dedicated power source, it is desirable to keep power consumption low in order to have a long service time, i.e. life time of the battery or the like. On the other hand, the wireless transmission consumes relatively much energy. Thus, it has already been proposed that the sensor does not communicate to the controller constantly, but intermittedly. For instance, if the sensor only transmits a measuring signal once per second, and the transmission duration is 20 ms per transmission, the energy consumption is roughly reduced by a factor 50.

US patent application 2008/0007394 describes an illumination system where each light source is provided with a sensor for sensing the light level close to the light source. Here, the light sensor is not wireless, is not powered from a battery, and transmission of measuring signals is continuous, reduction of power consumption clearly not being an issue.

U.S. Pat. No. 6,340,864 describes an illumination system with a wireless sensor, which transmits its data periodically in small bursts, for instance once every second.

SUMMARY OF THE INVENTION

It is a general object of the invention to improve on prior art illumination systems of the type discussed above such as to achieve a further reduction of energy consumption without loss of functionality.

The controller will know the required light level, indicated as target level, and it will receive information from the sensor indicating the actual light level. Processing the received sensor signal, the controller will know whether or not the dim level setting of the light source is correct, or whether the light source should emit more or less light. If the actual light level corresponds, within a certain margin, to the target level, the controller does not have to change anything. However, in such case it would not have been necessary for the sensor to transmit the sensor signal and consume energy in doing so. Thus, under normal circumstances when the daylight level will remain substantially constant, systems where the sensor is continuously or repeatedly, at fixed intervals, transmitting measuring data waste energy in most of the transmissions.

Thus, according to the present invention, an important reduction of energy can be achieved if the sensor avoids transmitting a data signal as long as the actual light level is within target limits.

According to the present invention, the sensor is provided with a memory containing information defining features of the control behaviour of the controller, and the sensor refrains from transmitting any sensor signal if the controller, on receiving such signal, would not respond by changing the lamp settings.

According to a first aspect of the present invention, the sensor refrains from transmitting any sensor signal if it finds that the actual light level is within target limits.

Once the sensor finds that the actual light level is outside the target level and transmits a sensor signal, the controller can not respond by adjusting the lamp light level immediately, because this would be noticeable to the human eye. Rather, the controller slowly adjusts the lamp setting such as to crawl to a corrected setting within a time frame of about 10-30 seconds (or perhaps even longer). This means that the sensor measurements will, for some time, still find that the actual light level is outside the target margins. However, transmitting this information to the controller does not tell the controller anything new, and does not change the way in which it is changing the lamp settings. According to a second aspect of the present invention, the sensor refrains from transmitting any sensor signal if it finds that the controller response is as expected, or during the time that the lamp setting is adjusted.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
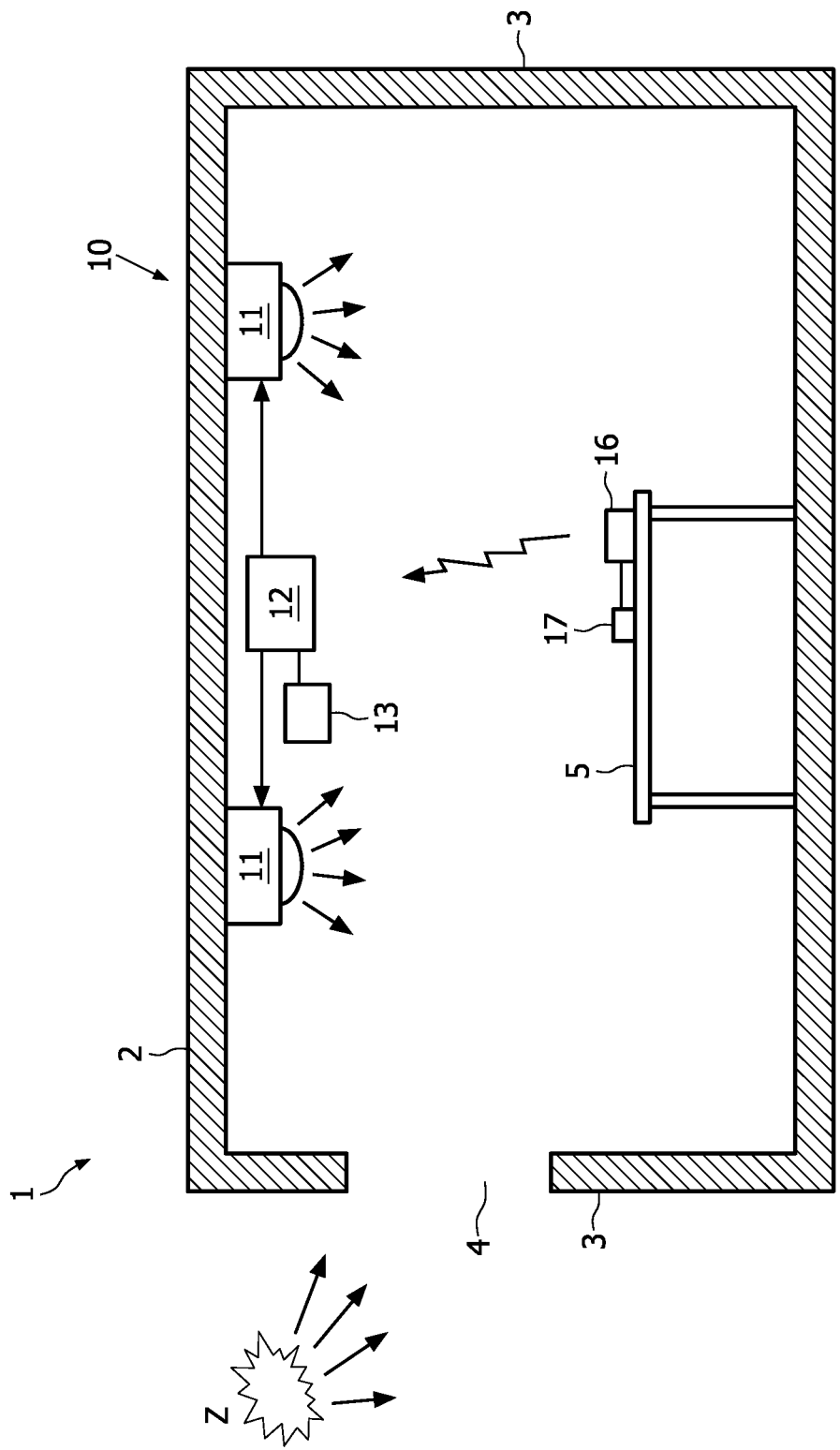
FIG. 1 schematically shows an office room.

FIG. 1 schematically shows a side view of an office room 1, having a ceiling 2 and walls 3, and having at least one window 4 in at least one of the walls 3 (the lefthand wall in this case). An office desk is schematically shown at 5. The room is provided with an illumination system 10, which comprises at least one light source 11 and a controller 12 for controlling the light source(s). The controller may for instance be implemented as a suitably programmed micro processor or the like. Each light source 11 may for instance be implemented as an incandescent lamp, a gas discharge lamp, an LED, etc. Each light source may be provided by a dedicated driver, or multiple light sources may share a common driver. In any case, the light sources are controllable. Since controllable light sources as well as controllers for controlling such light sources are known per se, a further explanation is not needed here. By way of example, controlling the light output of a lamp may be implemented by duty cycle control, as would be known to a person skilled in the art. In the following, light sources will simply be indicated as "lamp", but this would include LEDs.

The system 10 is adapted to keep the light intensity (or light level) at the position of the desk 5 substantially constant. For instance, if the sun Z is shining and daylight enters the room such that the light level increases, the controller 12 adapts its control signals for the lamps 11 such as to reduce the light output of each lamp. The controller 12 needs to receive an input signal indicating the actual light level, and to this end the system 10 comprises at least one light sensor 16. The light sensor 16 may for instance be mounted against the ceiling 2 or against a wall 3, but in the example of FIG. 1 the sensor 16 is shown positioned on the desk 5. The light sensor 16 is adapted to communicate its measuring signals to the controller 12 wirelessly. A suitable example of such wireless communication is for instance Zigbee, but any other type of wireless communication may be used, as will be clear to a person skilled in the art. Since light sensors are commonly known per se, and even wireless light sensors are known per se, a more detailed explanation of design and operation of the light sensor 16 is not needed here.

Figure 2:
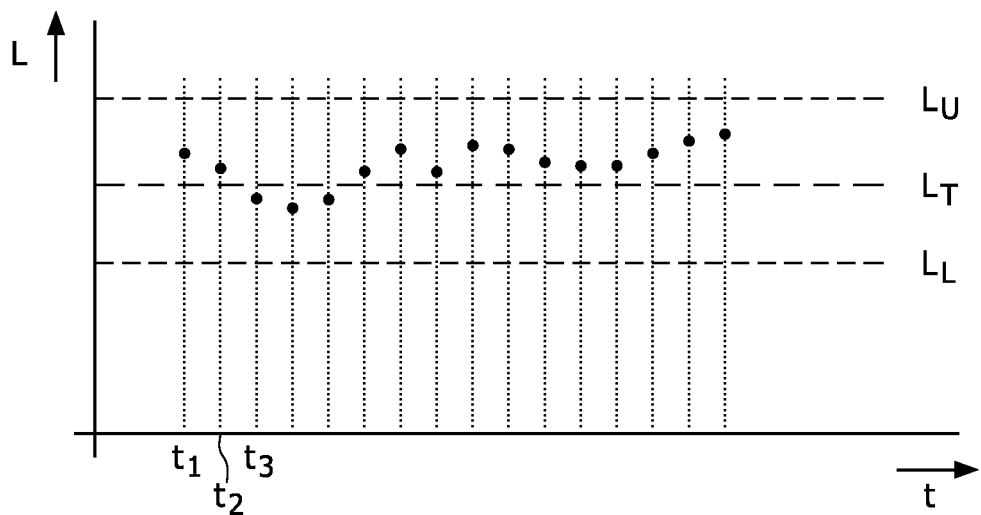
FIG. 2 is a timing diagram.

FIG. 2 is a timing diagram schematically illustrating some aspects of the operation of the system 10. The horizontal axis in FIG. 2 represents time t, the vertical axis represents light level L. In order to save energy, the sensor 16 does not measure the light level continuously, but it measures the light level regularly, at measuring moments that are indicated by vertical dotted lines, and that will be indicated as t1, t2, t3, etc. Typically, the measuring moments will have constant time intervals, but that is not essential for the present invention. Further, it is noted that the phrase "measuring moment" should not be interpreted as meaning that the measuring process will be infinitely fast; rather, the measuring moments will have a finite duration, typically in the order of a few milliseconds.

$L_T$ indicates a target light level: this is the intended light level in the room. The controller 12 will try to make the light level equal to the target level $L_T$, taking into account certain tolerance margins $L_U$ and $L_L$. $L_U$ indicates an upper margin higher than $L_T$, and $L_L$ indicates a lower margin lower than $L_T$. Typically, the difference between $L_U$ and $L_T$ will be a few percent, the exact value of this difference not being relevant for the present invention; the same applies to $L_L$. The difference $L_U$–$L_T$ may be equal to the difference $L_T$–$L_L$, but this is not necessary.

The black dots in FIG. 2 indicate illustrative measuring values of the light level, which will be indicated as $L_1$, $L_2$, $L_3$ etc, corresponding to $t_1$, $t_2$, $t_3$ etc. The figure shows that all measuring values are between $L_U$ and $L_L$. The controller 12, when receiving a measuring signal indicating light level Li, will compare the received value Li with the upper limit $L_U$ and with the lower limit $L_L$. If it appears that Li>$L_U$, the controller 12 will reduce the light output of the lamps 11; if it appears that Li<$L_L$, the controller 12 will increase the light output of the lamps 11. In the example shown in FIG. 2, the controller will not change the settings of the lamps 11 on receipt of any of the measuring values, because each time the controller finds that the measured light Li is within the tolerance margins.

In the prior art, the sensor 16 would transmit each and every measuring value Li (i indicating an index) to the controller 12. However, the wireless transmission of the data consumes relatively much energy. The present invention is based on the insight that energy can be saved if the sensor would be designed to not transmit any data if such transmission is not needed. According to a further aspect of the invention, such transmission is not needed if, on receipt of the data, the controller would not respond by changing any lamp setting. Thus, based on the above insight, the sensor 16 according to the present invention is provided with a memory 17 containing data identifying at least the upper light limit $L_U$ and the lower light limit $L_L$. Further, the sensor 16 is adapted to compare the measured value Li with the limit values $L_U$ and $L_L$ from memory, and to decide whether or not to transmit the measured value based on the outcome of this comparison. Particularly, the sensor 16 will only transmit the measured light level Li if it finds that Li>$L_U$ or Li<$L_L$.

Figure 3:
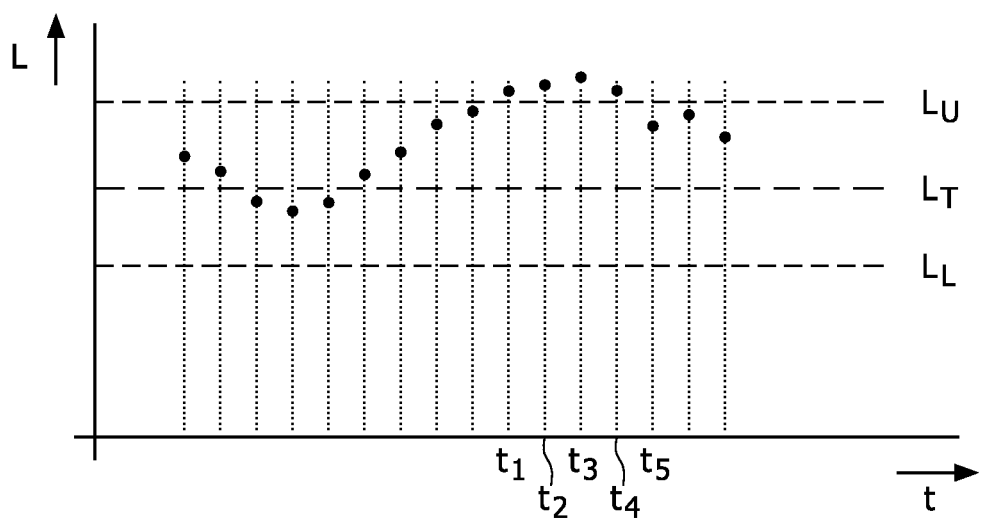
FIG. 3 is a timing diagram.

FIG. 3 is a diagram comparable to FIG. 2, illustrating this aspect of the invention. Up to t1, the measured light level L is between $L_U$ and $L_L$; thus, the sensor 16 will not transmit any data to the controller 12. On time $t_1$, the sensor 16 finds that the measured light level $L_1$ is above $L_U$; thus, the sensor 16 will transmit the measured value to the controller 12. On receipt, the controller 12 will take action and will reduce the light output of the lamps 11. The result of this action is also shown in this figure: the light level decreases.

In principle, it would be possible for the controller 12 to reduce the light output of the lamps 11 stepwise immediately. However, if the light output of the lamps is changed too quickly, the change would be visible to the human eye, and this is not desirable. Therefore, the controller 12 is designed to change the light output gradually, so that it would take some time, typically in the order of 30 seconds or so, before the actual light level would be back on target. The "speed" at which the controller changes the light output of the lamps will be indicated as change rate R, which can be expressed as R=ΔL(11)/Δt, L(11) indicating the light output of the lamps 11. It should be clear that this change rate R can be positive or negative. The value of the positive change rate may be equal to the value of the negative change rate, but this is not essential. Thus, the controller 12 can operate in two different modes, i.e. a normal mode in which the light output L(11) of the lamps is constant and R=0, and a change mode in which the light output L(11) of the lamps is changed and R<>0. The controller switches from normal mode to change mode on receipt of a measuring signal indicating an actual light level outside the tolerance margins, and switches back to the normal mode some time later.

As a consequence, it will take some time before the measured light level would be back within the tolerance margin. This is clearly visible in the illustration of FIG. 3: the measured values $L_2$, $L_3$, $L_4$ at times $t_2$, $t_3$, $t_4$ are still higher than $L_U$, and just at $t_5$ the measured value $L_5$ has dropped below $L_U$. If the sensor 16 would simply consider that the measured values $L_2$, $L_3$, $L_4$ are outside the tolerance margin, it would also transmit these measured values. This would be suitable for systems where the controller would be designed to slightly reduce the light output each time it receives a measurement signal indicating that the actual light level is too high, and where the controller would be designed to keep the light output constant if it does not receive a measurement signal. However, it is to be expected in such systems that the actual light level would be close to one of the margin levels: the sensor would not "protest" by sending a measurement signal, and the controller would not change any lamp setting in the absence of any received measurement signal. It is more desirable that the actual light level would be closer to the target level $L_T$. However, to achieve this in such system, the controller would need to receive more measurement signals.

In a further elaboration of the present invention, a further improvement is offered in that the controller 12 continues with changing the light output L(11) of the lamps 11 even after the actual light level has returned to within the tolerance margins, until a termination criterion is met. This termination criterion may for instance be the lapse of a predetermined time interval. Later, a more sophisticated criterion will be discussed.

With the controller 12 being designed as described above, the controller 12 would enter the change mode on receipt of the measurement signal from the sensor 16, and would return to the normal mode when the termination criterion is met. When operating in the change mode, the controller would keep the change rate R constant, irrespective of any further measurement signal being received. In other words, the controller 12 does not change its operation if it would receive a further measurement signal indicating that the actual light level is outside the tolerance margin. In accordance with the principles of the present invention, a further energy saving can be obtained if the sensor 16 would now be prevented from transmitting any measurement signal, even if the actual light level would be outside the tolerance margins. This can be implemented by designing the sensor 16 such that, after having sent a measurement signal, it will refrain from such transmission during a predetermined time.

The purpose of the light output change is to bring the actual light level closer to the target level. However, it may be that the change rate R is insufficient. In that case, the controller should amend the change rate R. These features are implemented in a preferred embodiment of the present invention, which will be explained with reference to FIG. 4, which is a graph comparable to FIGS. 2 and 3. As in the case of FIG. 3, the actual light level L increases until it exceeds above the upper margin $L_U$ on time $t_1$. This is found by the sensor 16, which transmits the measurement signal to the controller. The system will now enter a change mode, in which the controller will gradually reduce the light output (it should be clear that the same would apply, mutatis mutandis, when the actual light level would fall below the lower margin LL) using a first value of the change rate R. In this change mode, the system will assume shifted target level $L_{TS}$, which is shifted with respect to the original target level $L_T$, while the amount of shift $\Delta L_T = |L_{TS} - L_T|$ is reduced with time. Thus, the shifted target level follows a target shift function, which describes the shifted target level as a function of time. This target shift function may suitably but not essentially be a linear function, which is graphically represented as sloping line 41 in FIG. 4. Likewise, a shifted upper margin $L_{US}$ follows an upper margin shift function represented by sloping line 42, and shifted lower margin $L_{LS}$ follows a lower margin shift function represented by sloping line 43. These shifted levels define a shifted tolerance margin, which reflects the expected development of the actual light level in response to the changing output level of the lamps caused by the controller in its change mode. As long as the actual light level is within these shifted tolerance margins, the controller will keep the change rate R constant.

In accordance with the present invention, the memory 17 of the sensor 16 contains information defining these shift functions, for instance as a look-up table, a formula or the like. In other words, the sensor knows what the controller is doing, or at least is expected to do. While in the change mode, the sensor 16 will compare the measured light level with the shifted margins $L_{US}$ and $L_{LS}$, and will refrain from transmitting the measured value if it finds that the measured light level is within the shifted margins $L_{US}$ and $L_{LS}$. Thus, in the example illustrated in FIG. 4, the sensor 16 will transmit the measured value only at time $t_1$. It can be seen that, at all later times, the measured values are within the shifted tolerance margins, and the actual light level approaches the original target level without the sensor needing to transmit any further measurement values.

It is noted that, if the measured light level would be outside the shifted tolerance level, the sensor would transmit the measurement signal to the controller, even if the measured light level would be within the original tolerance level.

Figure 4:
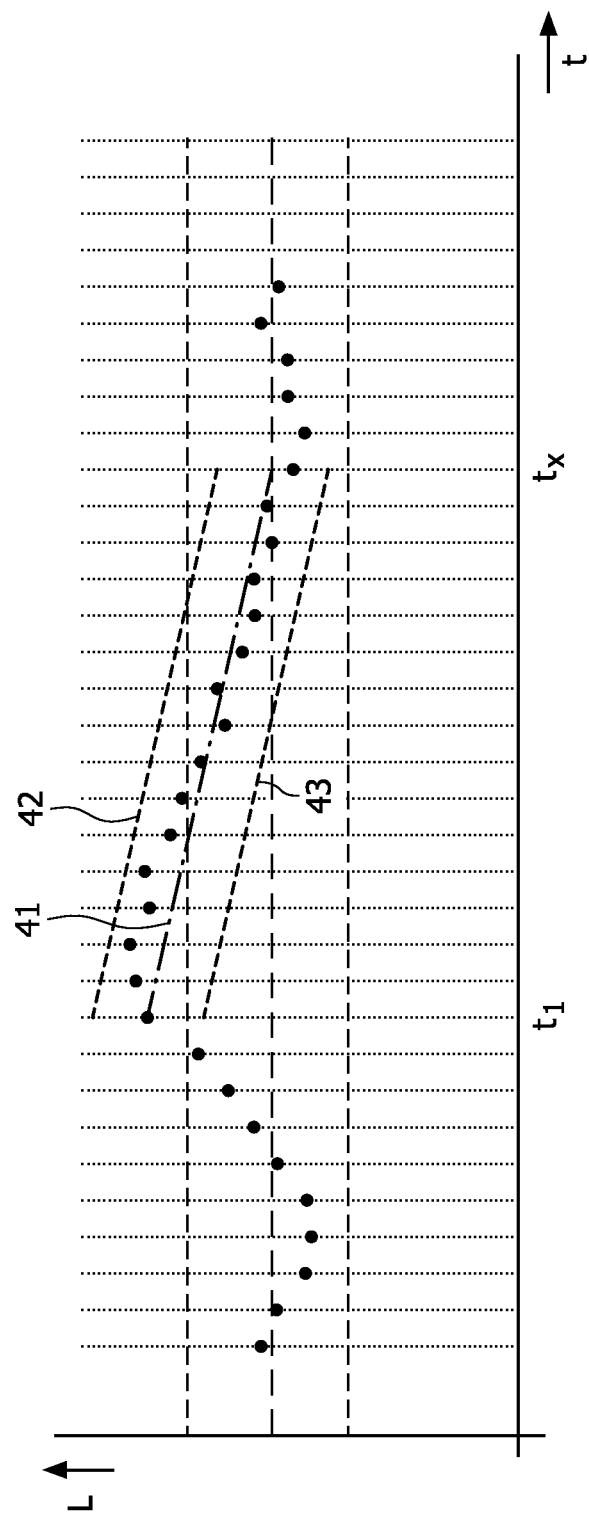
FIG. 4 is a timing diagram.

FIG. 4 shows that the shifted tolerance margins end at a time tx: at that time, the system returns to normal mode.

In the change mode, the controller initially sets a value for the change rate R. This value may be a predetermined value, fixed in a memory 13 of the controller 12, and also fixed in the memory 17 of the sensor 16. Ideally, this change rate R would bring the actual light level back to the target level in a predetermined time. However, as mentioned, it may be that such fixed value is inadequate so that the initial value of the change rate is too high or too low. According to a further elaboration of the present invention, the controller 12 is capable of calculating an adequate value of the change rate, depending on the actual daylight level.

This will be explained for the case of an increasing light level exceeding the upper tolerance level $L_U$, but the same explanation would apply, mutatis mutandis, when a decreasing light level would underpass the lower tolerance level $L_L$.

Assume that the nominal light output of the lamp 11 is indicated as $P_{nom}$, and that the actual dim factor is indicated as y, so that the actual light output Pout of the lamp can be expressed as Pout=$y \cdot P_{nom}$. Assume further that the portion of the light output that reaches the sensor can be expressed as x: this means that the light level $L_{lamp}$ from the lamp, as measured by the sensor 16, can be expressed as $L_{lamp} = x \cdot y \cdot P_{nom}$. It is noted that the dim factor y would be known to the controller since it is set by the controller, $P_{nom}$ is a fixed value which can be known to the controller by being stored in memory 13, and x will typically be a fixed value which can be found by calibrating and be stored in the memory.

The actual total light level L as measured by the sensor 16 is a summation of the lamp light $L_{lamp}$ and the daylight Lz provided by the sun Z, according to $L = Lz + L_{lamp}$.

When the controller 12 receives the measurement signal from the sensor 16, it knows the value L and it can calculate $L_{lamp}$. Thus, the controller 12 can calculate the daylight level Lz according to the formula $Lz = L - L_{lamp}$.

The controller also knows the target level $L_T$ (either because $L_T$ and $L_U$ are expressed in absolute values, or because $L_T$ is expressed as a percentage of $L_U$ or vice versa). Thus, the controller 12 can calculate the required amount of reduction of the actual light level according to $$\Delta L = L - L_T = Lz + L_{lamp} - (Lz + L_{lampT}) = L_{lampT} - L_{lampT}$$

in which $L_{lampT}$ indicates the target value of the lamp light $L_{lamp}$. It is clear that $\Delta L$ does not depend on the amount of sunlight $Lz$.

Writing $L_{lampT}$ as $x \cdot y_T \cdot P_{nom}$, it is clear that the controller 12 can calculate a target value $y_T$ for the dim factor of the lamp 11. So, the dim factor should be changed with an amount $\Delta y = y - y_T$.

The controller 12 is designed to calculate a change rate $R = \Delta y/tc$, in which tc is a predetermined change time stored in the controller's memory 13. tc would correspond to tx−t1 in FIG. 4.

It is noted that the change rate R is proportional to the error $L - L_T$, and does not depend on the amount of sunlight $Lz$. Thus, it is possible to calculate in advance a relationship between L and $\Delta y$, or even a relationship between L and R, and to store this relationship into the controller's memory 13, either in the form of a formula or a look-up table, for instance.

In a further elaboration, the controller 12 is self-learning. Assume that, after time tc, the actual light level is outside the tolerance margins. Thus, the controller 12 will receive a measurement signal from the sensor. Apparently, the change rate as calculated in the above is inadequate: it should have been higher or lower. Since the controller 12 knows the actual light level, the controller 12 can calculate how much higher or lower the change rate R should have been, and adapts the values in its memory 13 accordingly.

One possible fact causing deviations from the expected light level after the change time tc is that the nominal lamp power $P_{nom}$ has changed, for instance by ageing, or the factor x has changed, or both. According to a further elaboration of the present invention, the controller 12 is capable of operating in a calibration mode, in which it calculates the actual value of the product of x and $P_{nom}$. The controller 12 can do this by temporarily increasing or decreasing, or both, the dim factor y.

Figure 5:
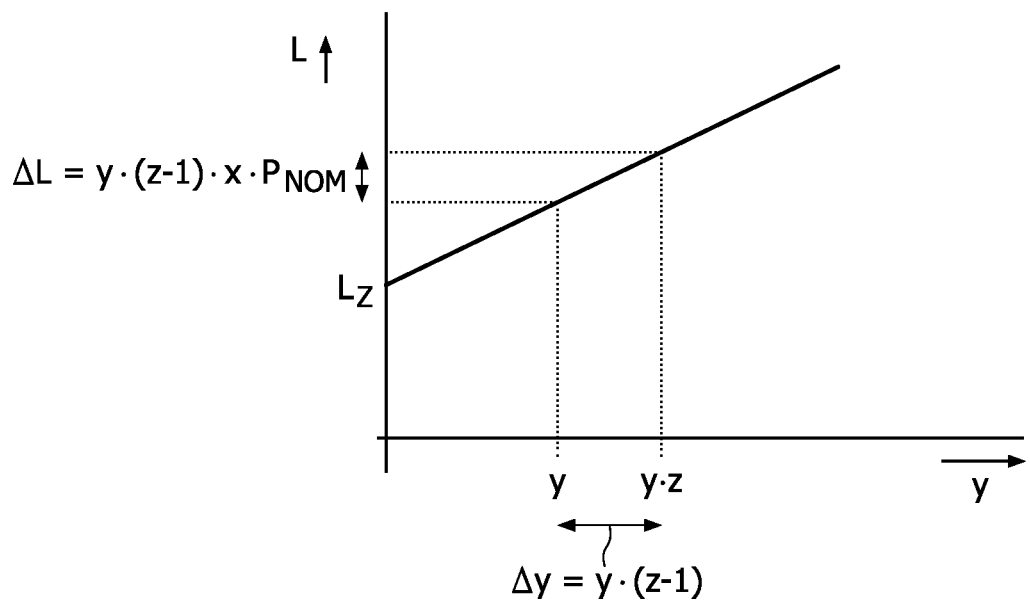
FIG. 5 is a graph schematically illustrating the light level as a function of lamp dim factor.

FIG. 5 is a graph schematically illustrating the light level L (vertical axis) as a function of lamp dim factor y (horizontal axis). Referring to FIG. 5, assume that the dim factor y is increased by a factor z. From the formulas given above, it should be clear that as a result the light level increases with $\Delta L = z \cdot x \cdot y \cdot P_{nom} - x \cdot y \cdot P_{nom} = y \cdot (z-1) \cdot x \cdot P_{nom}$. Thus, by measuring $\Delta L$, the controller can calculate $x \cdot P_{nom}$. The controller 12 can assume that x is constant and calculate the current value for $P_{nom}$ and store this value into its memory. Alternatively, the controller 12 can assume that $P_{nom}$ is constant and calculate the current value for x and store this value into its memory. Alternatively, the controller 12 can store the current value for $x \cdot P_{nom}$ into its memory.

Figure 6:
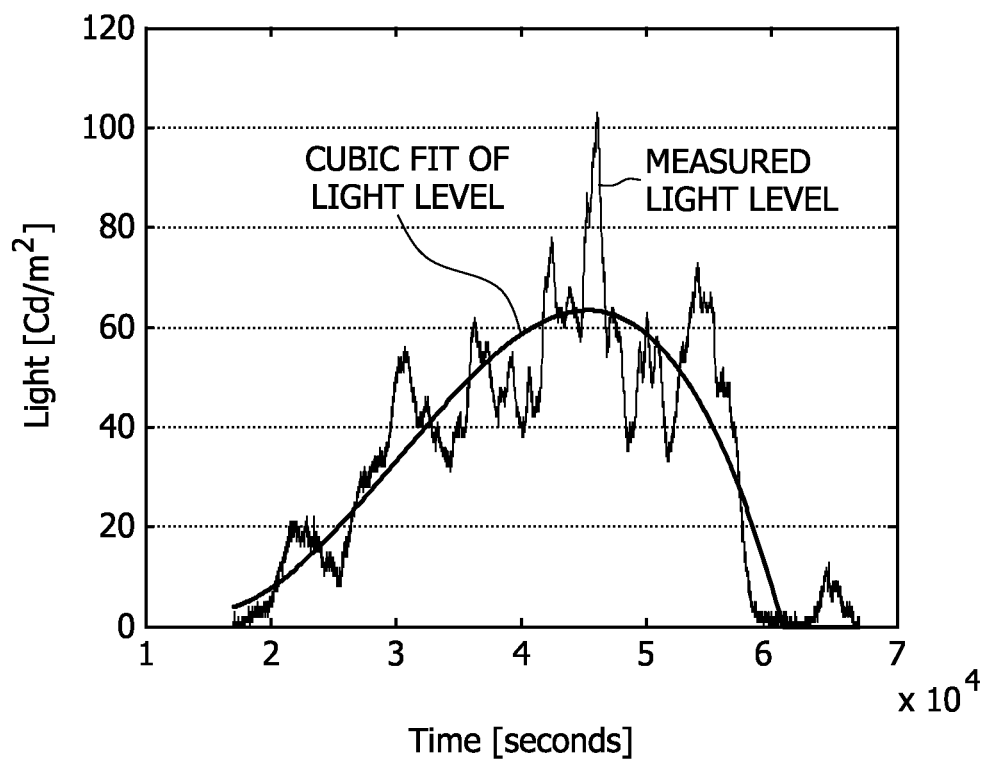
FIG. 6 is a graph schematically illustrating the daily variation of daylight.

FIG. 6 is a graph illustrating the daily variation of daylight (vertical axis, Cd/m²) as a function of time (horizontal axis, seconds) measured for an exemplary situation. Apart from fluctuations which may be caused by passing clouds, it can clearly be seen that a general tendency exists, indicated by the solid line, which is a cubic fit.

According to a further elaboration of the present invention, this fit can be used to predict the daylight and thus to adapt the change rate R in order to further minimize communication needs between sensor and controller.

Figure 7:
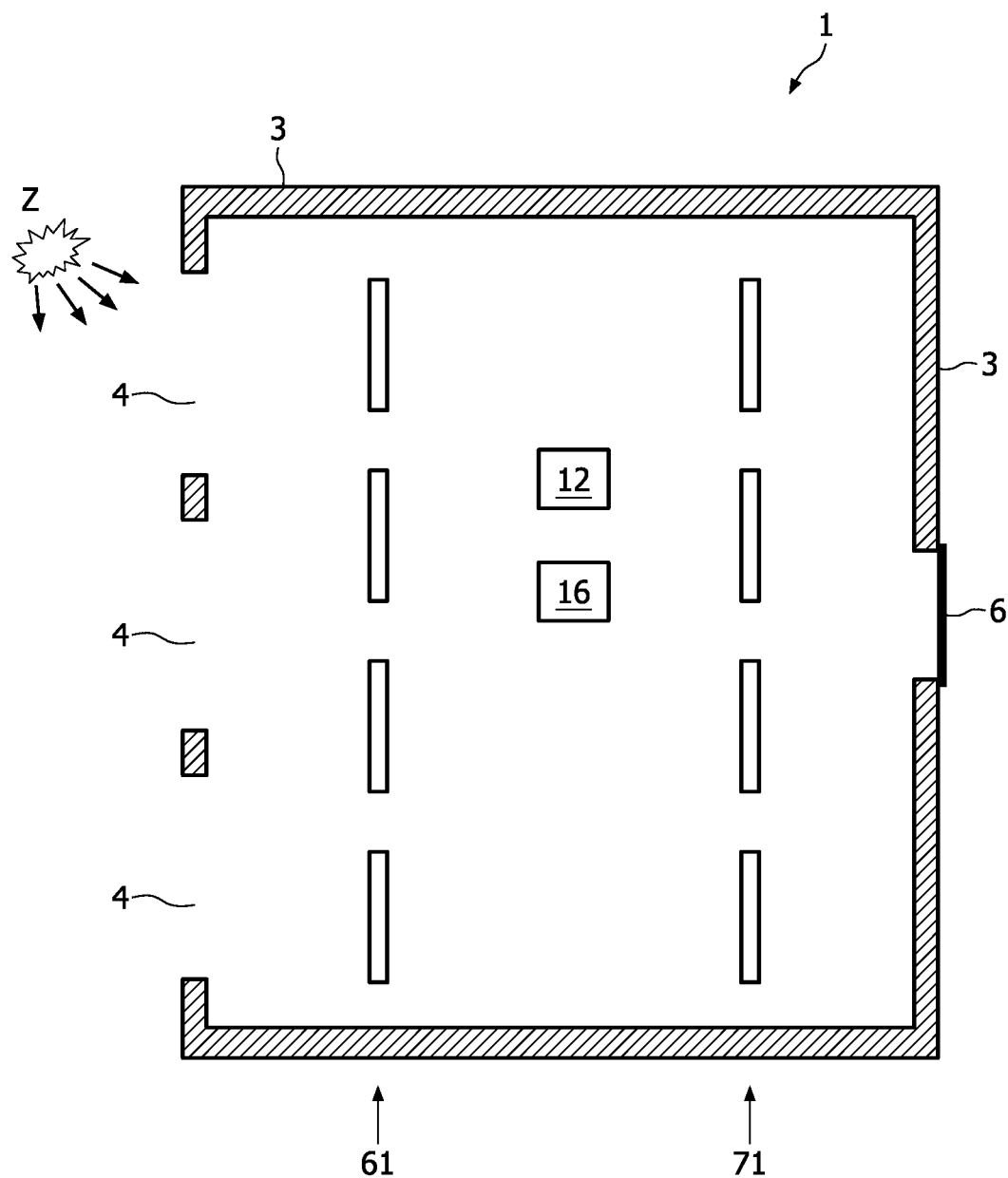
FIG. 7 is a schematic top view of a room with multiple lamps.

A problem may occur in a room having multiple light sources. FIG. 7 is a schematic top view of a room 1 with walls 3, one or more windows 4 in one wall, and a door 6 typically located in the wall opposite the windows and giving access to a corridor (not depicted). The room has one light sensor 16 and one controller 12 in common for multiple lamps 61, 71. The lamps are arranged in rows, a first row of lams 61 located close to the windows 4 and a second row of lamps 71 arranged at larger distance from the windows.

In such situation, it is a problem that the level Lz of sunlight closer to the windows 4 is higher than the level more remote from the windows. If all lamps are driven at the same power, the light level at a location close to the windows would be too high or the light level at a location opposite the windows would be too low, or both.

Figure 8:
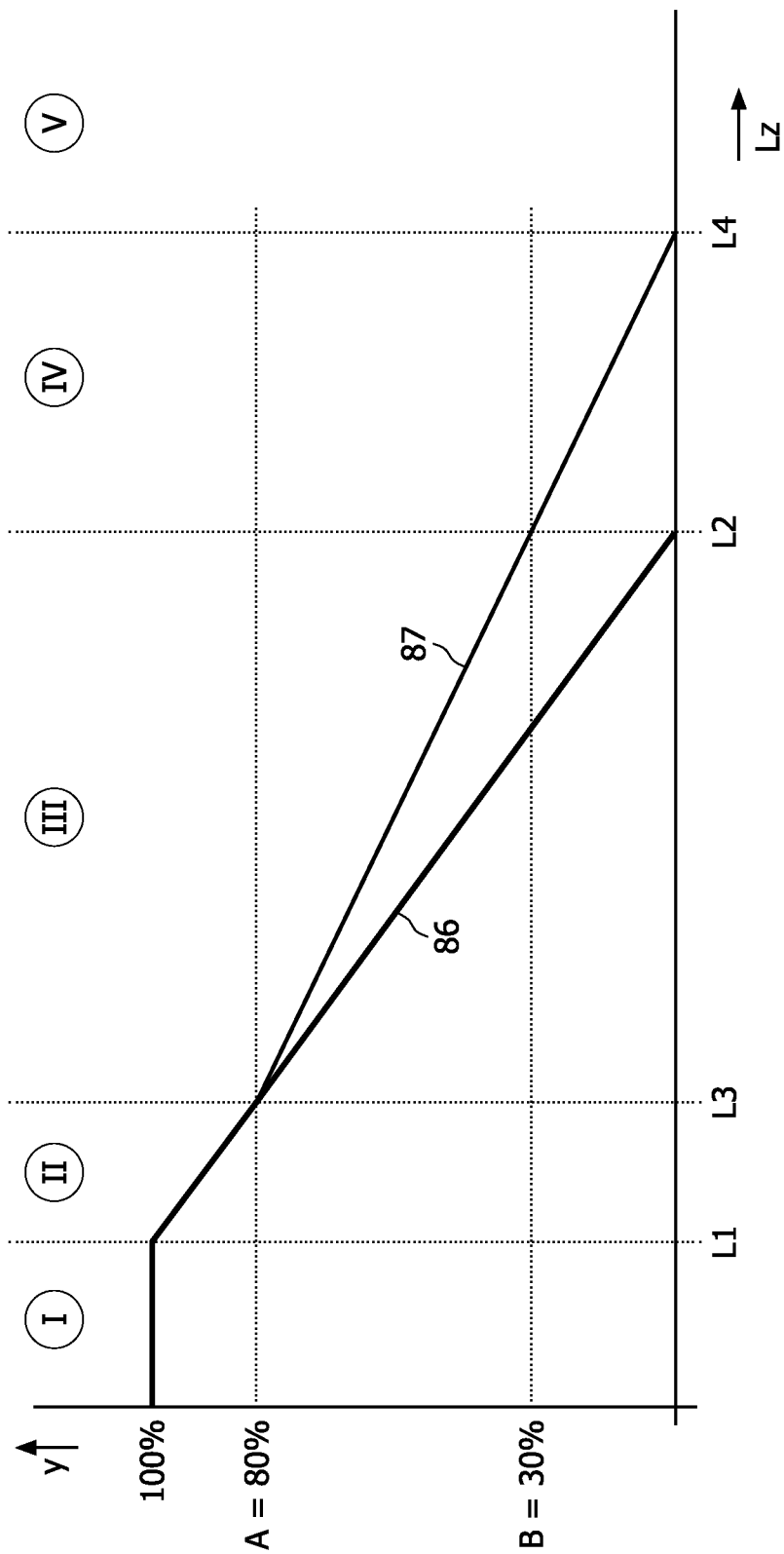
FIG. 8 is a graph schematically illustrating the lamp power as a function of daylight.

FIG. 8 is a graph illustrating a lamp control scheme proposed by the present invention to solve this problem. The horizontal axis represents the amount of sunlight Lz, such as for instance detected by the sensor 16, and the vertical axis represents the target dim factor $y_T$ for the lamps, as set by the controller 12, for the lamps 61 close to the window (curve 86) and for the lamps 71 remote from the window (curve 87). Based on the amount of sunlight Lz, the controller can operate in five different modes, indicated in Roman numerals in the figure.

In a first mode, indicated I, the sunlight level Lz is lower than a certain first value L1, which is so low that all lamps are driven at full power (dim level 100%).

When the sunlight level Lz is higher than this first value L1 but lower than a certain second value L2, the lamp light can be dimmed if the sunlight level increases, and vice versa, in order to maintain the light level constant. Thus, the controller varies the dim factor y(61) for the lamps 61 close to the window inversely proportional to the sunlight level Lz, such that y(61) equals zero when Lz equals L2, according to the formula:

$$y(61) = 100\% \times (L2 - Lz)/(L2 - L1), L1 \leq Lz \leq L2 \quad (1)$$

The controller makes a distinction between y(61) being higher than a first predetermined level A (second mode II) and y(61) being lower than this predetermined level (third mode III); in the example of FIG. 8, this first predetermined level A is equal to 80%, but this first predetermined level may be selected differently; said first predetermined level may even be as high as 100%. It is noted that said first predetermined level A corresponds to a third value L3 for the sunlight level Lz.

In the second mode, the dim factor y(71) for the remote lamps 71 is equal to the dim factor y(61) for the lamps 61 close to the window, according to the formula:

$$y(71) = y(61), L1 \leq Lz \leq L3 \quad (2)$$

In the third mode, the controller takes into account that the remote lamps 71 benefit less from the sunlight Lz by selecting the dim factor y(71) for the remote lamps 71 higher than the dim factor y(61). The difference y(71)−y(61) increases with increasing sunlight level Lz, such that the difference y(71)−y(61) equals zero for Lz=L3 and is equal to a second predetermined level B for Lz=L2. In the example of FIG. 8, this second predetermined level B is equal to 80%, but this second predetermined level B may be selected differently. Thus, in the third mode, the dim factor y(71) can be expressed by the following formula:

$$y(71) = y(61) + 30\% \times (Lz - L3)/(L2 - L3), L3 \leq Lz \leq L2 \quad (3)$$

When the sunlight level Lz is higher than the second value L2, the controller in the fourth mode IV keeps y(61) equal to zero (lamps 61 close to the window switched off), but continues decreasing y(71) with increasing sunlight level Lz, so that y(71) becomes zero for a certain fourth value L4 of the sunlight level Lz, according to the following formula:

$$y(71)=30\% \times (L4-Lz)/(L4-L2), L2 \leq Lz \leq L4 \quad (4A)$$

Preferably, the proportionality factor for y(71) in the fourth mode IV is equal to the proportionality factor for y(71) in the third mode III, so that the following formula applies:

$$y(71)=30\% \times (L4-Lz)/(L4-L3), L3 \leq Lz \leq L4 \quad (4B)$$

When the sunlight level Lz is higher than the fourth value L4, the controller in the fifth mode V keeps y(71) equal to zero (remote lamps 71 switched off).

In a variation, the controller in the fifth mode V may keep y(71) at a small value, for instance 1%, in order to avoid switching on/off when the sunlight level Lz varies. In that case, the controller may switch of the remote lamps 71 (y(71)=0) when Lz is higher than L4 for longer than a predetermined delay, for instance 15 minutes. A similar variation may apply to y(61).

Summarizing, the present invention provides an illumination system 10 comprising a light source 11, a controller 12 controlling the power output of the light source, and a light sensor 16 wirelessly communicating with the controller.

In a normal mode, the controller controls the light source such that the light level remains substantially constant. In a change mode, the controller controls the light source such that the light level is gradually changed with a predetermined change rate R such as to decrease a deviation from a target level $L_T$. The controller switches from its normal mode to its change mode on the basis of input signals received from the light sensor. The light sensor measures a light level, and decides whether or not to communicate a signal to the controller.

The light sensor refrains from transmitting a signal when receiving the signal will not cause the controller to change its control behaviour.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, it is now possible that the sensor 12 does not communicate the value of the light level but does simply communicate the fact that the light level is above the upper level $L_U$. Since the controller knows the value of $L_U$ (stored in memory 17), the controller knows a fairly good approximation of the actual light level.

Further, instead of a room with lamps 61 located close to a window and lamps 71 located more remote from the window, the room may receive outside light from a different type of outside source rather than sunlight.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. An illumination system comprising:
   at least one light source;
   a controller for controlling the power output of the at least one light source;
   a light sensor wirelessly communicating with the controller;
   the controller being capable of operating
      in a normal mode, in which the controller is configured to control the at least one light source such that a light level remains substantially constant, and
      in a change mode, in which the controller is configured to control the at least one light source such that the light level is gradually changed with a predetermined change rate (R) so as to decrease a deviation from a target level ($L_T$), the controller being configured to switch from the normal mode to the change mode in response to one or more input signals received from the light sensor;
   wherein the light sensor comprises a memory containing data defining at least one characteristic of the behaviour of the controller and is configured to intermittently measure the light level, and determine whether or not to communicate a signal to the controller based on the measured light level and the data contained in the memory, the light sensor being configured to refrain from transmitting the signal when receiving the signal does not cause the controller to change the behaviour of the controller,
   wherein the sensor has information defining a predetermined upper margin ($L_U$) higher than the target level ($L_T$) and defining a predetermined lower margin ($L_L$) lower than the target level ($L_T$); and wherein the sensor in a first mode is designed to refrain from transmission if the measured light level is between the upper margin ($L_U$) and the lower margin ($L_L$).

2. The system according to claim 1, wherein the sensor refrains from transmission within a predetermined time interval after a previous transmission.

3. The system according to claim 1, wherein the sensor, if the measured light level is higher than the upper margin ($L_U$), transmits a signal to the controller and obtains from the memory information defining a shifted target level ($L_{TS}$) higher than the target level ($L_T$), a shifted upper margin ($L_{US}$) higher than the shifted target level ($L_{TS}$), and a shifted lower margin ($L_{LS}$) lower than the shifted target level ($L_{TS}$);
   wherein the controller, in response to receiving the measuring signal, is designed to gradually decrease the light output of the at least one light source; wherein the sensor, after having transmitted the signal to the controller, operates in a second mode in which the sensor is adapted to gradually decrease the shifted upper margin ($L_{US}$) and the shifted lower margin ($L_{LS}$) and, at later measuring moments, to refrain from transmission if the measured light level is between the shifted upper margin ($L_{US}$) and the shifted lower margin ($L_{LS}$).

4. The system according to claim 3, wherein the sensor is adapted to switch from second mode to first mode when the shifted target level ($L_{TS}$) becomes equal to the original target level ($L_T$).

5. The system according to claim 4, wherein the controller has a memory containing a change rate for the light output of the at least one light source;
- wherein the sensor has stored in the memory, data defining a change rate for the shifted target level ($L_{TS}$), the shifted upper margin ($L_{US}$) and the shifted lower margin ($L_{LS}$); and
- wherein, if at the first measuring moment after the sensor has switched from second mode to first mode the sensor finds that the measured light level is higher than said upper margin ($L_U$) or lower than said lower margin ($L_L$):
  - the light sensor is designed to transmit the signal to the controller and switches to operating in the second mode;
  - the controller is designed to adapt the change rate in the memory of the controller;
  - the sensor is designed to adapt the change rate in the memory of the sensor in a corresponding manner.

6. The system according to claim 1, comprising
- a first group of one or more lamps located proximately to an outside light source; and
- a second group of one or more lamps located farther from the outside light source than the first group of one or more lamps;
- wherein the controller is designed to control a first dim factor of the first group of lamps and a second dim factor of the second group of lamps as a function of a sunlight level Lz, such that the second dim factor is always higher than or equal to the first dim factor;
- wherein dim factor=zero indicates lamp OFF and dim factor=100% indicates lamp fully ON.

7. The system according to claim 6, wherein:
- if the sunlight level Lz is between zero and a certain first value L1, the controller is designed to operate in a first mode in which $y(61) = y(71) = 100\%$;
- if the sunlight level Lz is between the first value L1 and a certain third value L3, the controller is designed to operate in a second mode in which $$y(61) = y(71) = 100\% \times (L2-Lz)/(L2-L1),$$

L2 being a second value higher than the third value L3;
- if the sunlight level Lz is between the third value L3 and the second value L2, the controller is designed to operate in a third mode in which $$y(61) = 100\% \times (L2-Lz)/(L2-L1),$$

$$y(71) = y(61) + B \times (Lz-L3)/(L2-L3),$$

B being a predetermined dim factor;
- if the sunlight level Lz is between the second value L2 and a fourth value L4, the controller is designed to operate in a fourth mode in which $$y(61) = \delta,$$

$$y(71) = B \times (L4-Lz)/(L4-L2),$$

if the sunlight level Lz is higher than the fourth value L4, the controller is designed to operate in a fifth mode in which $$y(61) = y(71) = \delta.$$

8. The system according to claim 7, wherein $\delta=0$.

9. The system according to claim 7, wherein $\delta$ initially is a small value higher than zero, and wherein the controller is designed to set $\delta=0$ after having operated in the fifth mode for a predetermined duration.

10. The system according to claim 1, wherein the signal transmitted by the sensor is a measuring signal indicating the value of the light level measured.

11. The system according to claim 1, wherein the signal transmitted by the sensor is a signal indicating that the value of the light level measured is higher than an upper margin ($L_U$) or lower than a lower margin ($L_L$).

12. An illumination system comprising:
- at least one light source;
- a controller for controlling the power output of the at least one light source;
- a light sensor wirelessly communicating with the controller;
- the controller being capable of operating
  - in a normal mode, in which the controller is configured to control a light source such that a light level remains substantially constant, and
  - in a change mode, in which the controller is configured to control the at least one light source such that the light level is gradually changed with a predetermined change rate (R) so as to decrease a deviation from a target level ($L_T$), the controller being configured to switch from the normal mode to the change mode in response to one or more input signals received from the light sensor;
- wherein the light sensor comprises a memory containing data defining at least one characteristic of the behaviour of the controller and is configured to intermittently measure the light level, and determine whether or not to communicate a signal to the controller based on the measured light level and the data contained in the memory; the light sensor being configured to refrain from transmitting the signal when receiving the signal does not cause the controller to change the behaviour of the controller, wherein the signal transmitted by the sensor is a signal indicating that the value of the light level measured is higher than an upper margin ($L_U$) or lower than a lower margin ($L_L$).

* * * * *